Dec. 2, 1941. E. B. GARD Re. 21,962
CURTAIN STRETCHER
Original Filed Oct. 26, 1938 3 Sheets-Sheet 1
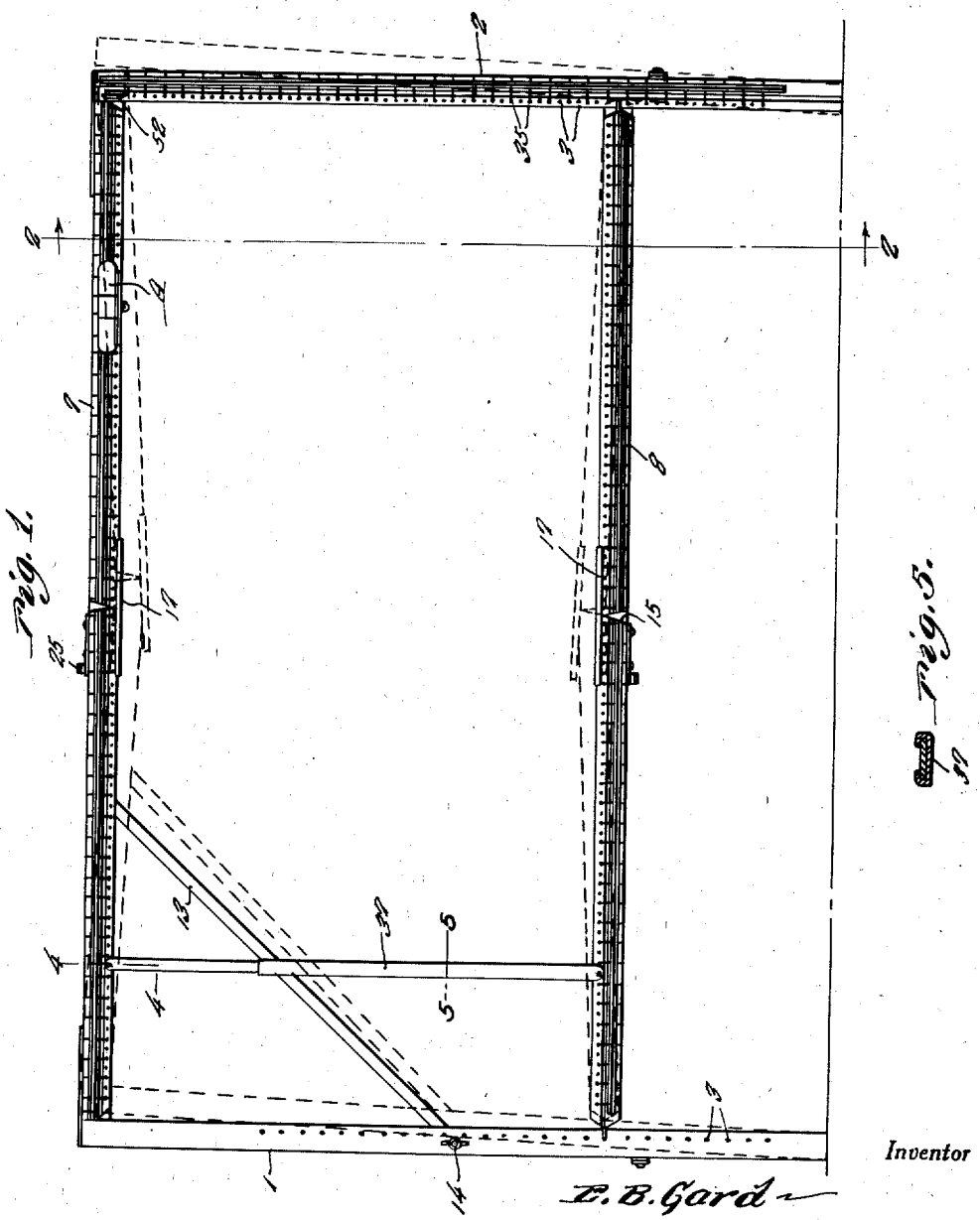
Inventor
E. B. Gard
By Clarence A. O'Brien and Hyman Berman
Attorneys Dec. 2, 1941. E. B. GARD Re. 21,962

CURTAIN STRETCHER

Original Filed Oct. 26, 1938 3 Sheets-Sheet 2

Inventor

E. B. Gard

By Clarence A. O'Brien and Hyman Berman

Attorneys

Dec. 2, 1941. E. B. GARD Re. 21,962
CURTAIN STRETCHER
Original Filed Oct. 26, 1938 3 Sheets-Sheet 3
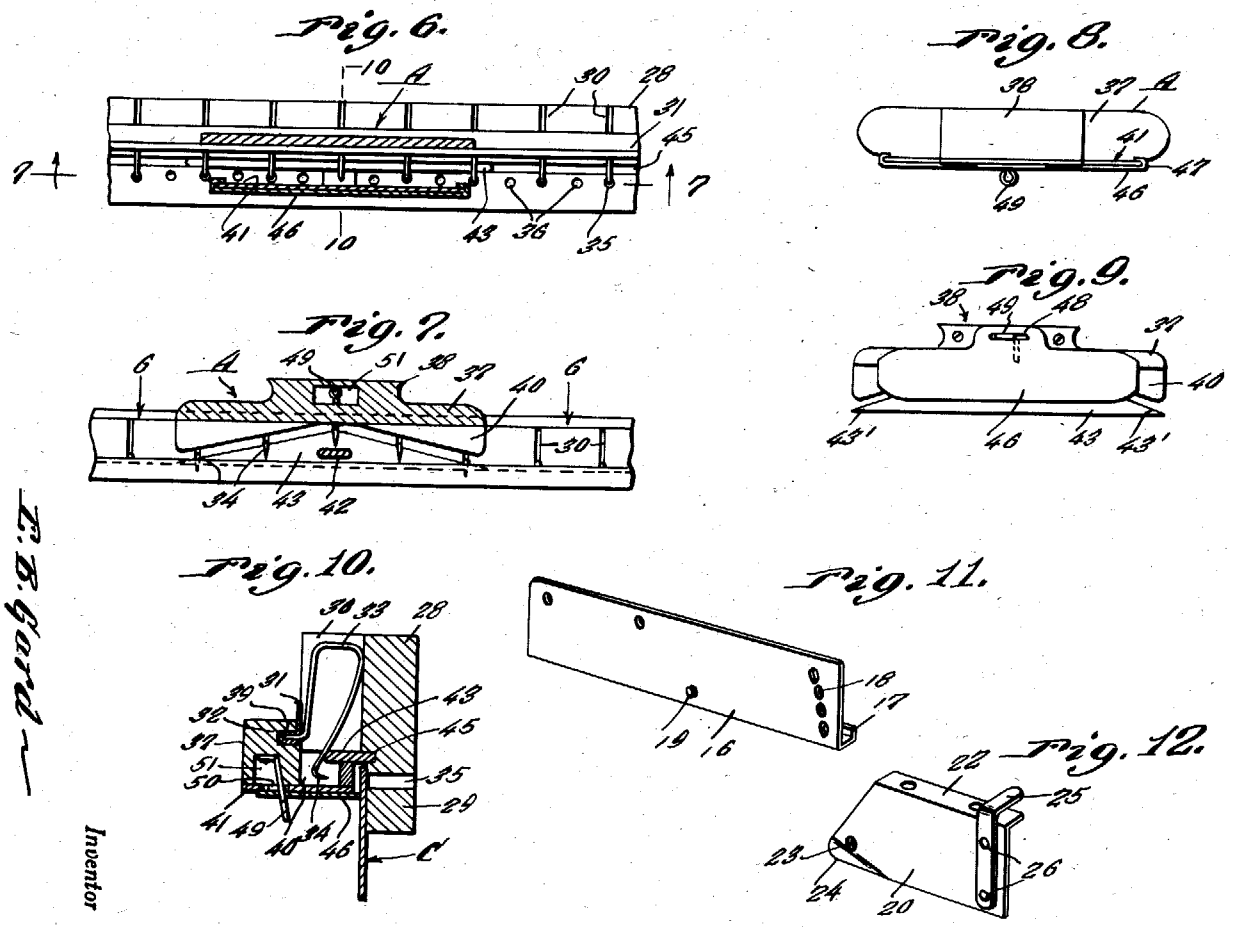
Inventor
E. B. Gard
By Clarence A. O'Brien and Hyman Berman
Attorneys Reissued Dec. 2, 1941

Re. 21,962

UNITED STATES PATENT OFFICE 21,962

CURTAIN STRETCHER

Emmett B. Gard, New Castle, Pa.

Original No. 2,165,629, dated July 11, 1939, Serial No. 237,132, October 26, 1938. Application for reissue filed July 11, 1941, Serial No. 402,046

11 Claims. (Cl. 45—24)

This invention relates to a curtain stretcher, the general object of the invention being to provide means whereby the curtain can be easily and quickly attached to the stretcher frame by passing a member along the parts of the frame and over edges of the curtain and cause the holding means to engage the curtain and to so construct and arrange the holding means that the operator cannot be injured thereby.

Another object of the invention is to provide means whereby the frame can be easily and quickly contracted to permit a shrunken curtain to be attached thereto, after which the frame is expanded to stretch the curtain.

Another object of the invention is to make the frame parts in sections with means whereby the sections can be easily and quickly connected together.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a front view of the invention.

Figure 5 is a section on the line 5—5 of Figure 1.

Figure 6 is a section on the line 6—6 of Figure 7.

Figure 7 is a section on the line 7—7 of Figure 6.

Figure 8 is an elevational view of the shuttle or sliding member for actuating the curtain holding means.

Figure 9 is a plan view of the sliding member.

Figure 10 is a section on the line 10—10 of Figure 6.

Figure 11 is a perspective view of one of the plates for connecting one section of a horizontal member to the other section thereof.

Figure 12 is a view of the other plate for connecting the two sections together.

Figure 2:
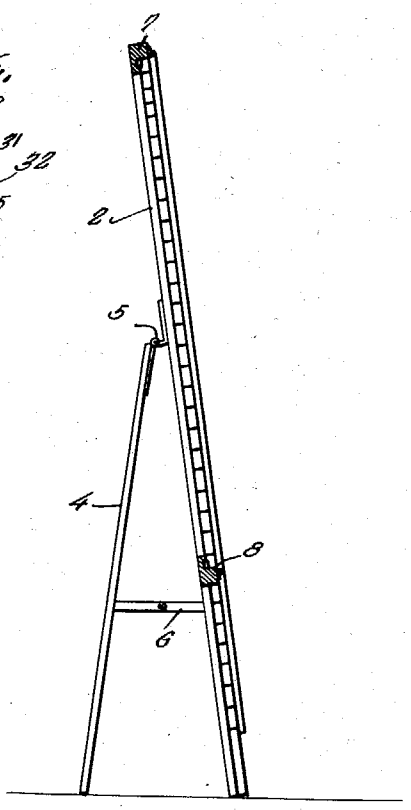
Figure 2 is a section on the line 2—2 of Figure 1.
Figure 4:
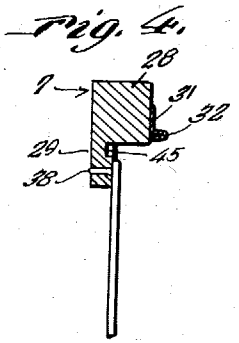
Figure 4 is a section on the line 4—4 of Figure 1.

In these drawings, the numerals 1 and 2 indicate a pair of end members, each of which is formed with a longitudinally extending row of holes 3 adjacent its inner edge and each member has a leg 4 hinged thereto as shown at 5, the leg being connected with the member by a pair of links 6 pivotally connected together and pivoted to the leg and the member, these links acting to hold the parts in the position shown in Figure 2, when the links are straight and permitting the leg to be folded against the member by moving the links upwardly or downwardly. The upper and lower horizontal members are shown at 7 and 8 and the lower member 8 has the projections 9 at its ends for engaging desired holes 3 in the members 1 and 2 so that this member 8 can be adjusted toward and away from the upper member 7. The upper member 7 has the plates 10 connected with its ends and each plate has the keyhole slots 11 therein for engaging the headed projections 12 at the upper ends of the end members 1 and 2 for detachably connecting the member 7 to the end members 1 and 2. A diagonally arranged brace 13 has one end detachably connected to the end member 1 by the screw and thumb nut shown generally at 14 and a similar screw and thumb nut connects the other end of the brace 13 with the member 7.

Figure 3:
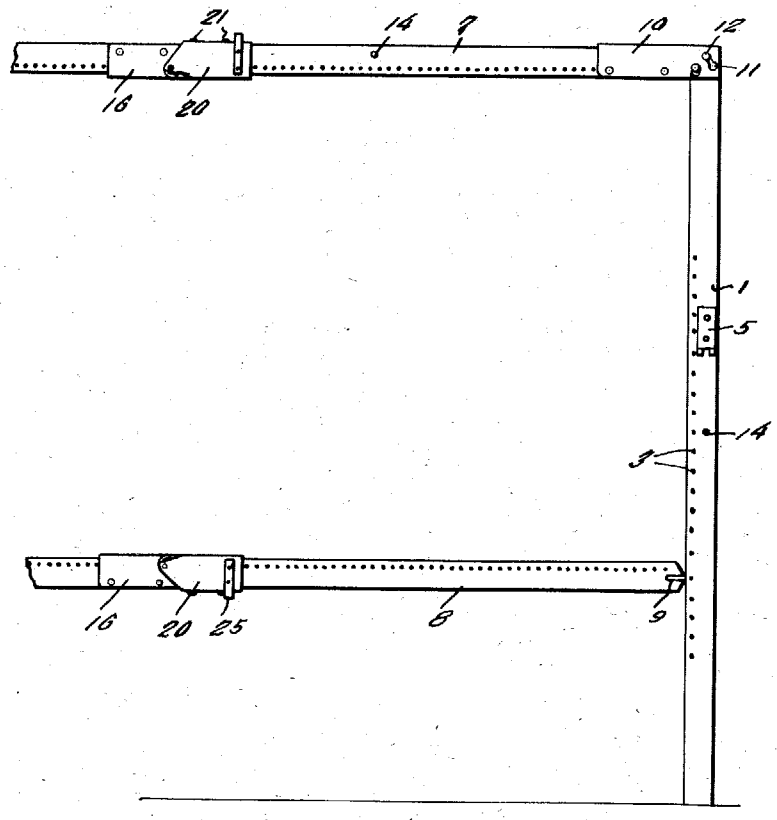
Figure 3 is a fragmentary rear elevational view.

Each of the members 7 and 8 is formed of two sections having beveled inner ends as shown at 15 in Figure 1. An elongated plate 16, see Figure 11, is formed with a channel 17 at one side edge thereof to be fastened to one section of each member and projects from the inner end of said section and at its free end is formed with an arcuate row of holes 18 and said plate intermediate its ends is also provided with a projection 19. A substantially angle plate 20, see Figure 12, is connected with the inner end of the other section of each member by suitable fastening means 21 passing through holes formed in the flange 22 of said member 20 into the section. As will be seen from Figure 3 the flange 22 of member 20 for the upper member 7 is fastened to the upper edge of one section of the member 7 while the member 20 for the section of the lower member 8 is fastened to the lower edge of said section. The major portion of the member 20 is free of the section to which it is connected so that this part can overlap the plate 16 and the free end of this part 20 has a hole 23 therein for engaging the projection 19 of plate 16. The plate 20 is slightly resilient so that a bent lip 24 can be forced over the projection 19 to engage the projection 19 in the hole 23. Thus the two sections of each of the members 7 and 8 are detachably connected together by the plates 16 and 20 and they are pivotally connected together by means of the projection 19 of plate 16 fitting in the hole 23 of plate 20 and in order to hold the two sections of each member 7 and 8 in adjusted position I provide a latch member 25 on the plate 20 of spring metal which is fastened to the plate by the pins or rivets 26, the lower one of which projects to engage any one of the holes 18. By pressing upon the bent end of the latch member the plate 20 is swung outwardly so as to free the projecting part of the pin 26 from a hole 18 and then as soon as the latch is released the resiliency of the plate 20 will cause it to go back into its original position and thus cause the pin 26 to engage another hole 18. As shown in Figure 3, the bent end of the upper latch member extends over a section of the upper member 7 while the bent end of the lower latch member extends under a section of the lower member 8 and the channel 17 of plate 16 engages the lower edge of the section of the upper member 7 and the lower plate 16 engages an upper edge of the lower member 8.

Each of the members 2, 7 and 8 is formed with a thick outer part 28 and a narrow inner part 29, this part 29 forming a seat for an edge of the curtain C, as shown in Figure 10. The thickened part 28 is formed with a plurality of spaced slots 30 in its front face and a strip 31 is attached to the front face and is formed with an outwardly extending flange 32 of channel-shape. A substantially U-shaped spring member 33 is located in each slot 30 and has an end of one limb bent and extending into the channel and is suitably secured therein. The other limb has its end bent and pointed to provide a pin 34 which normally engages a hole 35 formed in the narrower part 29, one of these holes being located adjacent each slot and when the curtain is in place these pins 34 will pass through an edge portion thereof and enter the holes 35 so that the curtain is firmly attached to the member and as the pin point is located in the hole there is no danger of the operator being injured by these pins.

Another row of holes 36 is formed in the part 29 of each of the upper and lower members 7 and 8 and these holes 36 alternate with the holes 35 as clearly shown in Figure 6 and the holes 3 in member 2 alternate with the holes 35 of said member 2 as shown in Figure 3. An elongated member 37, composed of two telescopic sections, as shown in Figure 1, has pins 38 at its ends for engaging selective ones of the holes 36, this member being adapted to be passed through a hem in that end of the curtain opposite the end which is held by the members 33 of the end member 2. Thus this member 37 can be adjusted as to its length to suit the position the member 8 as relative to the member 7 and it can also be adjusted toward and away from the member 2 to suit the length of the curtain being stretched.

A shuttle or sliding member A is provided for moving the members 33 to releasing position as shown in Figure 10 and this sliding member includes a body 37 formed with a handle part 38 and having a groove 39 therein for receiving the flange 32 of the strip 31 and said body being formed with a longitudinally extending centrally arranged flange 40 the free edge of which diverges from the center as shown in Figure 7. This flange engages the inner edge of part 28. A plate 41 is fastened to the body and extends parallel to and is spaced from the flange 40 and the center part of the plate 41 carries a lateral lug 42 which supports a plate 43 in alignment with the flange 40 the inner edge of the plate 43 having its inner edge shaped to conform to the free edge of the flange 40 and the two edges form a groove for the passage of those limbs of the U-shaped members 33 which carry the pins 34. The ends of the plate 43 form points 43′, see Figure 9, and each point passes between the pin carrying limbs of the members 33 and an edge of the curtain so that these limbs of the members 33 are pressed outwardly to permit the curtain to assume the position shown in Figure 10 and then as the sliding member is moved along said limbs return to the normal position with the pins 34 passing through the curtain into the holes 35. A groove 45 is formed in the part 29 of each of the members 2, 7 and 8 and the straight edge of plate 43 slides in this groove, the pin carrying limb of the U-shaped member 33 extending across the groove when the member 33 is in normal position.

A presser plate 46 is slidably arranged on the plate 41 by having its ends bent over the ends of the plate 41 as shown at 47. This plate 46 has a slot 48 therein through which extends a spring member 49 which also passes through a slot 50 of angle shape in the plate 41 and is fastened in a recess 51 in the body 37. This spring member when in the horizontal part of the slot 50 will hold the plate 46 in raised position, as shown in Figure 9, but when in the vertical part of the slot the spring member will hold the plate 46 in lowered position, with respect to Figure 9 and yieldingly engaging the curtain and pressing the same against the part 29, as shown in Figure 10. The ends of the plate 46 are rounded or beveled so that it can ride over the curtain. A spring finger 52 is carried by the upper end of the member 2 for engaging and holding a corner of a curtain at the beginning of the operation of attaching the curtain to the parts of the frame, this finger being shown in Figure 1.

By constructing the device in the manner described it will occupy but little space when knocked down and in setting up the device the two sections of each of the members 7 and 8 are connected together by placing the beveled ends 15 of the two sections adjacent each other, with the plate 16 underlapping the plate 20 and pressing the lip 24 against the projection 19 to cause the projection to enter the hole 23. Then the two sections are moved into alignment with each other while depressing the bent end of the latch member 25 and then by releasing this latch member the two sections are locked together. Then the end plates 10 have their holes 11 placed over the projections 12 to connect the upper member 7 with the end members 1 and 2 and, of course, the legs 4 are moved rearwardly and held in this position by the links 6 being straightened. The projections 9 of the lower member 8 are placed in suitable ones of the holes 3.

One corner of the curtain to be stretched is placed under the finger 52 and the upper edge of the curtain is held against the front face of the part 29 of the member 7 and then the slide member A is moved along the member 7 and as this sliding member A is so moved the plate 46, which is in the position shown in Figure 10, presses the curtain against the part 29 and the plate 43 moves the limbs which carry the pins 35 outwardly so that the plate 46 can position the upper edge of the curtain over the holes 35 and then as the member A passes the U-shaped members the pin carrying limbs move back to their original positions to cause the pins 34 to penetrate the curtain and enter the holes 35. The member A is moved off the left hand end of the member 8, the end member 1 being of such thickness as to permit the member A to be placed in engagement or out of engagement with either one of the members 7 and 8 and the thickened parts 28 of the members 7 and 8 are spaced from the thickened part of member 2 to permit the member A to be placed in engagement or out of engagement with the member 2. Then the member A is moved over the member 2 to connect one end of the curtain with said member 2. The member 37 is passed through a hem at the left end of the curtain after the sliding member is placed on the member 8 and then the pins 38 of the member 37 are placed in suitable holes in the members 7 and 8. Then the sliding member is used for connecting the pins of member 8 to the lower edge of the curtain and if desired or necessary either one or both of the members 7 and 8 can be moved to the dotted line position shown in Figure 1 to facilitate attaching the curtain to these parts or in stretching shrunken curtains.

It will, of course, be understood that the parts are marked with graduations to facilitate placing the parts in the desired position to stretch the curtains to the desired extent and it will also be understood that after the sliding member has been moved in one direction to connect the curtain with one of the members of the frame, it can be moved in a reverse direction to remove it from said member, without releasing the curtain as the curtain will not be released by the pin members unless a slight pull is exerted on the curtain as the sliding member releases the pin members to pull the curtain from under the pin members before they return to their holding positions. It will also be seen that while the pin carrying limbs of the U-shaped members will tend to return to normal position and cause the pins to penetrate the material of the curtains said limbs are forced through the material and into the holes by the free edge of the flange 40 so that there is no danger of the pin not penetrating the curtain.

When the sliding member is being moved in a reverse direction after it has been moved in a direction to attach the curtain to a frame member the pressure plate is lifted or moved into inoperated position by placing the spring member 49 in the longitudinally extending part of the slot 50 in plate 41.

I claim:

1. In a device of the class described, an elongated member having a longitudinally extending seat forming part for an article to be attached to the member and said seat forming part having a row of holes therein, spring members carried by the elongated member and having penetrating parts passing into the holes and a slide member slidably engaged with said elongated member and having a part for pressing the article on the seat forming portion and another part for first moving the penetrating members out of the holes and then returning the penetrating members to normal position to cause them to pass through the article back into the holes.

2. In a device of the class described, an elongated member having a seat forming part for an article to be attached to the elongated member and said seat forming part having a row of holes therein, a plurality of substantially U-shaped spring members carried by the elongated member and each having a penetrating part at the end of one limb thereof normally engaging a hole and a slide member slidably engaged with said elongated member and having a part for engaging the said limbs of the U-shaped members for moving the penetrating parts out of the holes and then permitting the penetrating parts to return to normal position to pass through the article when moved back into the holes.

3. In a device of the class described, an elongated member having a seat forming part for an article to be attached thereto, said part having a row of holes therein, substantially U-shaped spring members each having one limb operatively connected to the elongated member and the other limb having a bent penetrating point thereon for entering a hole, longitudinally extending guiding means on the elongated member, a sliding member engaging the guiding means, a plate carried by the sliding member and having one straight edge and its other edge diverging from a central point to the ends of the plate, said plate engaging the point carrying limbs of the spring members for first forcing said limbs outwardly from the seat forming part and then permitting the limbs to return to normal position to penetrate an article on the seat forming part.

4. In a device of the class described, an elongated member having a seat forming part for an article to be attached thereto, said part having a row of holes therein, substantially U-shaped spring members each having one limb operatively connected to the elongated member and the other limb having a bent penetrating point thereon for entering a hole, longitudinally extending guiding means on the elongated member, a sliding member engaging the guiding means, a plate carried by the sliding member and having one straight edge and its other edge diverging from a central point to the ends of the plate, said plate engaging the point carrying limbs of the spring members for first forcing said limbs outwardly from the seat forming part and then permitting the limbs to return to normal position to penetrate an article on the seat forming part, and an adjustable presser plate carried by the sliding member for pressing an article against the seat forming part.

5. In a device of the class described, an elongated member having a seat forming part for an article to be attached thereto, said part having a row of holes therein, substantially U-shaped spring members each having one limb operatively connected to the elongated member and the other limb having a bent penetrating point thereon for entering a hole, longitudinally extending guiding means on the elongated member, a sliding member engaging the guiding means, a plate carried by the sliding member and having one straight edge and its other edge diverging from a central point to the ends of the plate, said plate engaging the point carrying limbs of the spring members for first forcing said limbs outwardly from the seat forming part and then permitting the limbs to return to normal position to penetrate an article on the seat forming part, and an adjustable presser plate carried by the sliding member for pressing an article against the seat forming part, and a flange carried by the sliding member and having an edge of the same shape as the operative edge of the plate and forming a groove with said edge of the plate.

6. In a device of the class described, an elongated member having a thickened part and a reduced seat forming part for an article to be attached to the elongated member, said seat forming part having a row of holes therein and a plurality of slots in the thickened part, spring members supported in the slots and each having a point normally located in a hole and a slide member slidably engaged with said elongated member and having a wedge-shaped part terminating in a point for forcing the points of the spring members out of the holes and then permitting the spring members to return to normal position to cause the points to penetrate the article and then pass into the holes.

7. A curtain stretching device of the class described comprising a pair of end members and a pair of side members, each side member and one end member having a seat forming part at its inner edge for an edge portion of a curtain and said seat forming part having a row of holes therein, a plurality of spring members carried by each of said pair of side members and said one end member and having points for entering the holes, each of said pair of side members and said one end member having a plurality of openings for receiving the spring members, a sliding member adapted to be slidably engaged with each of the side members and said end member, said sliding member having a longitudinally arranged substantially flat U-shaped groove therein, one wall of which terminates in a point at each end of the sliding member for guiding the point carrying parts of the spring members into the groove which moves the points out of the holes and then returns the spring members to normal position with the points passing through the curtain and into the holes, a spring actuated presser member carried by the sliding member for pressing an edge portion of the curtain against the seat forming part and a member for engaging the end of the curtain opposite that which is held to the said one end member and means for adjusting said curtain engaging member on the side members, said curtain engaging member being telescopic.

8. In a device of the class described, an elongated member forming a seat for an article to be attached thereto and having a plurality of spaced holes therein, spring members carried by the elongated member and having penetrating parts passing into the holes, and a slide member slidably engaged with said elongated member, said slide member having a portion thereon for first moving the penetrating members out of the holes and then returning the penetrating members to normal position to cause them to pass through the article back into the holes.

9. In a device of the class described, an elongated member having a longitudinally extending seat forming part for an article to be attached to the member and said seat forming part having a row of holes therein, spring members carried by the elongated member and having penetrating parts passing into the holes and a slide member slidably engaged with said elongated member and having a part for first moving the penetrating members out of the holes and then returning the penetrating members to normal position to cause them to pass through the article back into the holes.

10. In a device of the class described, an elongated member forming a seat for an article to be attached thereto and having a plurality of spaced holes therein, spring members carried by the elongated member and having penetrating parts passing into the holes, and a slide member slidably engaged with said elongated member, said slide member being provided with means for first moving the penetrating members out of the holes and then returning said members to normal position to cause them to pass through the article back into the holes.

11. In a device of the class described, an elongated member forming a seat for an article to be attached thereto and having a row of holes therein, a plurality of pin members carried by the elongated member and each having a penetrating part normally biased to enter a hole and a slide member slidably engaged with said elongated member and having a part for engaging the pin members for moving the penetrating parts out of the holes and then permitting the penetrating parts to return to normal position to pass through the article when re-entering the holes.

EMMETT B. GARD.